United States Patent [19]
Woo et al.

[11] Patent Number: 5,642,285
[45] Date of Patent: Jun. 24, 1997

[54] OUTDOOR MOVIE CAMERA GPS-POSITION AND TIME CODE DATA-LOGGING FOR SPECIAL EFFECTS PRODUCTION

[75] Inventors: Arthur N. Woo, Cupertino; David S. Sprague, Portola Valley, both of Calif.

[73] Assignee: Trimble Navigation Limited, Sunnyvale, Calif.

[21] Appl. No.: 380,959

[22] Filed: Jan. 31, 1995

[51] Int. Cl.⁶ .................................................. H04N 5/76
[52] U.S. Cl. ................. 364/449.7; 352/131; 348/148; 348/512
[58] Field of Search .................................. 364/449, 460, 364/424.01, 449.7; 352/131, 132; 348/143, 148, 552, 239, 510, 512; 342/357, 457

[56] References Cited

U.S. PATENT DOCUMENTS

| | | | |
|---|---|---|---|
| 4,677,555 | 6/1987 | Goyet | 364/424 |
| 4,700,301 | 10/1987 | Dyke | 364/424 |
| 4,807,131 | 2/1989 | Clegg | 364/424.01 |
| 5,144,317 | 9/1992 | Duddek et al. | 342/357 |
| 5,148,179 | 9/1992 | Allison | 342/457 |
| 5,247,440 | 9/1993 | Capurka et al. | 364/424.05 |
| 5,262,867 | 11/1993 | Kojima | 358/29 |
| 5,267,042 | 11/1993 | Tsuchiya et al. | 358/209 |
| 5,296,884 | 3/1994 | Honda et al. | 354/106 |
| 5,335,072 | 8/1994 | Tanaka et al. | 348/232 |
| 5,506,644 | 4/1996 | Suzuki et al. | 354/106 |
| 5,517,419 | 5/1996 | Lanckton et al. | 364/449 |
| 5,519,620 | 5/1996 | Talbot et al. | 364/449 |

FOREIGN PATENT DOCUMENTS 8-88825  4/1996  Japan .

OTHER PUBLICATIONS

"Recent Advances in GPS Hardware & Software", Timble Navigation. Date Unknown.
B. Remondi, "'On-The-Fly' Kinematic GPS Results Using Full-wavelength Dual-Frequency Carrier Ranges". Date Unknown.

*Primary Examiner*—Michael Zanelli
*Attorney, Agent, or Firm*—Thomas E. Schatzel; Law Offices of Thomas E. Schatzel A Prof. Corporation

[57] ABSTRACT

A GPS navigation receiver with a data output port for communicating a position estimate frame-by-frame and time codes in SMPTE format. The conventional date and time sentence output of the GPS navigation receiver is combined with a highly-accurate one pulse-per-second (±one microsecond) to form a time-keeping base for the time code output. A data-logger records the position estimates with their corresponding time in time code format frame-by-frame in a database. The recorded position estimates are then used in special-effects post-production to direct the special-effects animation, modeling kinetics, etc., in a composite, final film or video.

13 Claims, 2 Drawing Sheets

OUTDOOR MOVIE CAMERA GPS-POSITION AND TIME CODE DATA-LOGGING FOR SPECIAL EFFECTS PRODUCTION

COPENDING APPLICATIONS

This application relates to two earlier filed U.S. patent applications, Ser. No. 08/232,830, filed on Apr. 22, 1994, now U.S. Pat. No. 5,450,344 and Ser. No. 08/363,681, filed Dec. 23, 1994, now U.S. Pat. No. 5,479,351 which are incorporated herein by reference.

BACKGROUND OF THE INVENTION

1. Field of the Invention

The invention relates generally to special effects filmmaking and more specifically to equipment and methods for tagging a movie camera's position, as determined by a global positioning system (GPS) navigation receiver, with time codes in a data-logger for special effects editing.

2. Description of the Prior Art

The filming, video and audio industries typically operate many recording devices during a single performance to capture the scene and/or sound from many different viewpoints. High performance recordings do not usually record sound and pictures on the same device. Editing is therefore relied upon to combine the recorded sounds and pictures so that they are synchronized with one another in a single final product.

Special effects combine various techniques of animation, computer imagery, models and "blue screen" to be inserted in live-action filming to give the fantastic real-life. Cameras with XYZ stepper-motor control are used in conjunction with models to give the effect of great size and/or flight. For example, a TV series, Star Trek, uses robotic-controlled cameras to pass by a model of the Starship Enterprise to create the illusion on film of a fly-by of a very large and graceful spacecraft. Such passages are later edited-in with the performances of the actors.

Most people are familiar with the clapper slate board a technician snaps in front of a movie camera when the director yells "action!". The purpose of this is not so well-known. There is a need to synchronize the sound with the picture. When a clapper slate is used, the audible clap is the sound sync point. Time code recording allows a different technique to be used. A time code clock keeps the time-of-day, for example, in hours, minutes, seconds and frames. A time code electronic slate has, in addition to clapsticks and the normal slate information, a time code reader, usually large red light emitting diode (LED) numerals. The time code display matches a time code used to record on the field sound recorder. By shooting a few frames of this slate on the film, a visual sync is established. When transferring the film in an editing session, e.g., with a telecine, all that is necessary is to stop on a frame that has the time code slate in view, enter the time code numbers into the machine synchronizer that controls the playback of the audio roll, and the synchronizer will automatically bring the audio into perfect sync. When the telecine is played the audio will stay in sync until the end of the take, when the camera and sound recorder are stopped.

Digital time codes are recorded on magnetic or optical media to uniquely identify the position of the media at any given point. It is used on optical media, e.g., film, and magnetic media, e.g., audio tape and video tape. Typical time codes contain a clock, control and synchronizing information and a user-definable code area. The clock information is conventionally organized such that increasing time denotes a point further into the reel of film or tape.

A time code is generally used for locating or referencing a specific point within a reel of film or tape. This is most useful in the editing process, and in fact is the basis for most modern videotape editing systems. Time codes may also be used for film editing, film on tape editing, and many other tasks. The availability of user-definable code area offers an almost unlimited range of data storage coincident with the time information. Information such as scene, take, camera roll number, time of day, etc. may be stored in these areas.

Conventional time codes may be divided into two types, magnetic and optical. The Society of Motion Picture and Television Engineers (SMPTE) developed a magnetic media type time code which was the first established version and remains the most widely used. It is recorded on longitudinal tracks on audio or video tape. It was originally specified for thirty frames/second operation, but will work at 29.97 frames/second as well.

The European Broadcasting Union (EBU) time code is standard in Europe and most of Asia, India, Africa and Central and South America. EBU time code is basically the same as SMPTE time code, but is specified for twenty-five frames/second operation. Film time code is also basically the same as SMPTE time code, but specified for twenty-four frames/second operation. DATAKODE, a trademark of Kodak Corporation, is a process using a finely dispersed transparent magnetic coating on a film stock that allows the recording of time code information on the film. It supports time and user bits like SMPTE time code, but in a different format. Vertical interval time code (VITC) is a magnetic media type time code that is designed to be recorded within the vertical interval period of video. It is treated as video by the recorder, but is a digital time code that offers time and user bits like SMPTE time code.

Bar time code is an optical media type of SMPTE time code. It has virtually the same structure as SMPTE time code but is recorded optically in a film camera. It is commercially-available in twenty-four, twenty-five, or thirty frames/second, as marketed by Coherent Communications for Arriflex cameras, in both sixteen millimeter and thirty-five millimeter formats.

Matrix time code is another optical media type time code that offers time and user bit information areas. An optical dot matrix field is used, rather than the linear bar time code, e.g., as used by Aaton in the sixteen millimeter format and Panaflex in the thirty-five millimeter format.

Time codes were once exclusively used by videotape editors. They are now being increasingly used for audio tape editing, film editing, video, audio and film production, audio tape and magnetic film mixing, videodisc mastering and more. In addition to the locating feature of the time bits, the information storage ability of the user bits is adding to the capability of time code systems. With transport synchronizers becoming smaller and cheaper, time code control and autolocation are becoming standard on professional audio and video recorders.

In framed media versus frameless film and tape media, visual information is recorded on a frame-by-frame basis. By playing discreet frames back at a high enough speed, the illusion of motion is created. Each frame of film or video can be identified by recording a number, e.g., a time code, next to the frame. Audio tape and magnetic film are essentially frameless media, e.g., the sound is recorded on a continuous basis with no frames. All any recorded time code information can do is indicate the running time of the audio. Since the time code number occupies about one-half of tape, at fifteen inches-per-second, a problem becomes apparent in reference to editing. One-half the resolution is much too poor for professional editing requirements. One frame of SMPTE time code is approximately thirty-three milliseconds long. Minimum editing standards require resolution to one millisecond, or better. To solve this problem, most time code equipment used with audio has provisions for subframe operation. This typically provides one hundred subframes per frame thereby offering resolution to 330 μs, which is more than enough for professional editing and synchronizing requirements.

The SMPTE time code is a longitudinal time code, although it is not the only such time code. It is designed to run at thirty frames/second, which is the frame rate of video in the NTSC television broadcast system used in North America. (The actual frame rate is 29.97 frames/second, which resulted with the introduction of broadcast color signals compatible with black and white receivers.) The SMPTE time code is a special digital time code comprised of data bits which occupy the same amount of time as one frame of video, e.g., two fields. The time code is locked to the video signal by a time code generator. The SMPTE digital time code is readable either forwards or backwards, and inversion of the time code by accidental phase reversal in wiring does not affect its operation. The time code is also readable at speeds varying from less than one inch-per-second to over 250 inches-per-second, and is usable at recording levels of −15 dB to +10 dB.

SMPTE time code has eighty bits, or cells, in which information may be stored. Twenty-six are used to store time information, thirty-two are used for user bits, sixteen are used for synchronization of the time code, three are unassigned, and three bits are used for control information.

The time code is sychronized to the video signal by the time code generator. The published specification states that the beginning of the eighty-bit time code word must start at the beginning of line #5 of the video signal, during the vertical sync time. Such synchronization is also known as time code phase. If the time code started at line #20 instead of line #5 it would be out of phase. The digital time code used resembles a square wave and suffers a certain amount of degradation each time it is recorded and played back on magnetic media. This is normal, and a time code reader is capable of reading time code off tape with an expected average amount of distortion.

A common feature of time code generators is the slave or jam-sync process. This allows a time code generator to follow the time code off another source, e.g., a tape machine. This would allow for regeneration of time code. There are two basic modes of slaving or jam-syncing time code, hard slave or hard jam, or soft slave or one-shot jam. Method one, the hard slave, forces the generator output to always follow the input. Method two, the soft slave, locks up to the input at first but runs free after that.

The main distinction is that hard slave will copy every frame of time code, even bad frames or missing bits. It is a direct copy, but is fresh time code with proper shape and amplitude. Soft slaving will copy the first few frames of time code exactly in order to match up the time code numbers, but will then run on as if it were an independent time code generator. The advantage of this is it will not copy bad frame numbers or missing bits. This technique is used often to repair time code that has been poorly recorded or damaged. Typically the soft slave process will copy the first four to sixteen frames of time code then switch over.

If the time code source in the soft slave process is discontinuous, jumps in the sequence of the time code will occur, such as 01:11:05:21 being followed by 01:15:46:29, e.g., when the production recording was stopped for a few minutes while the B master generator ran on. The output of the generator will not follow such discontinuities, because the soft slave generator is essentially a free running generator at this point. If all jumps in time code numbers are needed for reference, then the hard slave process must be used or the soft slave must be re-slaved after each jump in the time code.

SUMMARY OF THE PRESENT INVENTION

It is therefore an object of the present invention to provide a system for recording the position of a film-making device in a database with a frame-by-frame time code.

It is another object of the present invention to provide a system for special effects production using large outdoor objects in the scenes.

It is a still further object of the present invention to provide a device for frame accurate timing between cameras and sound, such as at boat races, large venue concerts, sports events, ground-to-air filming and regular production.

Briefly, an embodiment of the present invention comprises a GPS navigation receiver with a data output port for communicating a position estimate frame-by-frame and time codes in SMPTE format. The conventional date and time sentence output of the GPS navigation receiver is combined with a highly-accurate one pulse-per-second output (±one microsecond) to form a time-keeping base for the time code output. A data-logger records the position estimates with their corresponding time in time code format frame-by-frame in a database. The recorded position estimates are then used in special-effects post-production to direct the special-effects animation, modeling kinetics, etc., in a composite, final film or video.

An advantage of the present invention is that a system is provided for generating coordinated time codes and position estimates for large-scale outdoor scenes.

Another advantage of the present invention is that a system is provided that is simple to connect to cameras and recorders.

A further advantage of the present invention is that a system is provided that is accurate to within a microsecond of true time.

A still further advantage of the present invention is that a time code output is provided that is compatible with commercially-available video and film-making equipment.

These and other objects and advantages of the present invention will no doubt become obvious to those of ordinary skill in the art after having read the following detailed description of the preferred embodiment which is illustrated in the drawing figures.

IN THE DRAWINGS

FIG. 1 is a block diagram of a position and time code synchronization system for logging the position of an object frame-by-frame for video and film production of special effects sequences in a first embodiment of the present invention; and FIG. 2 is a block diagram of the satellite navigation receiver of FIG. 1.

DETAILED DESCRIPTION OF THE PREFERRED EMBODIMENT

Figure 1:
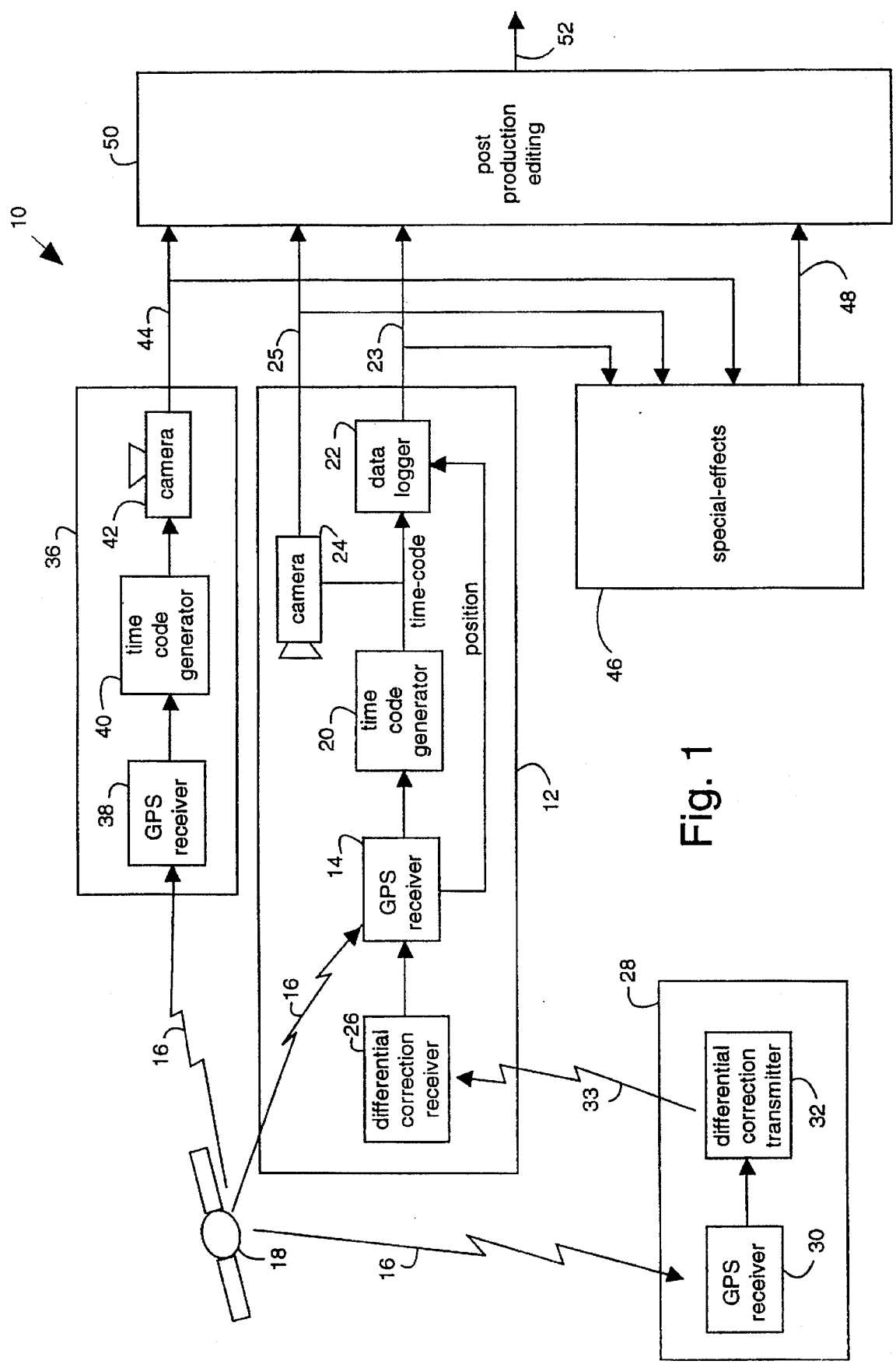

FIG. 1 illustrates a position and time code synchronization system for logging the position of an object frame-byframe for video and film production of special effects sequences in a first embodiment of the present invention, referred to herein by the general reference numeral 10. The system 10 includes a first production unit 12 which includes a navigation satellite receiver 14 for receiving a plurality of microwave radio transmission signals 16 from a constellation of orbiting navigation satellites 18. For example, the orbiting navigation satellites 18 are part of the global positioning system (GPS) operated by the United States Department of Defense. The orbiting navigation satellites 18 provide a highly accurate time base (clock) encoded in the signals 16 which is extracted by the receiver 14 and provided to a time code generator 20.

More accurate position solutions can be provided by the receiver 14 if it is a dual-frequency type (L1 and L2), but single-frequency (L1 only) type receivers can also provided results of acceptable accuracy when differentially-corrected.

The signals 16 are also conventionally used in a navigation process within the GPS receiver 14 to provide three-dimensional earth coordinate position determinations that are periodically output to a data-logger 22, which includes a database of position estimates related to time on a frame-by-frame time code format. For each real-time frame in a sequence, a time code representing that frame is recorded in the database together with a position estimate current for the time of the frame. For example, at a frame rate of twenty-four to thirty frames per second, the GPS receiver 14 provides at least twenty-four to thirty fresh, updated position estimates per second. An output line 23 represents the communication of the contents of the database out of the data logger 22. A camera 24 is physically proximate to the navigation satellite receiver 14, such that the position determinations of the navigation satellite receiver 14 represent the positions of the camera 24 at respective times.

Time code signals are output by the time code generator 20 to both the camera 24 and the data-logger 22. The time code signals are used by the camera 24 for frame synchronization and for encoding a film or video tape 25 being output with time code frame sequence numbering. The time code generator 20 provides an output representing the time of day and includes frame numbers. The frame rate is fixed according to the proper frame rate for the particular camera 24 employed. For example, the time code output is preferably formatted according to the published standard of the American National Standard Institute (New York, N.Y.) for video and audio tape time and control code, ANSI/SMPTE 12M-1986. Other formats are possible, and in foreign countries may also be desirable, for example EBU time code. The ANSI/SMPTE 12M-1986 format comprises eighty-bit data words.

The data-logger 22 associates a position determination provided by the navigation satellite receiver 14 with each frame number in a sequence from the time code generator 20, together with the time of day. The purpose is to record in precise terms of time expressed by frame sequence number, the position of the camera 24. Conventional attitude determination means may be included in the navigation satellite receiver 14 to provide camera attitude information to the data-logger 22 when that information is needed in post-production editing. The first production unit 12 may be used, for example, in the special-effects marriage of an animated version of Godzilla climbing the Golden Gate Bridge, as seen by a helicopter spiraling up from the ground and around the north and south towers. The first production unit 12 is actually mounted to a real helicopter that is flown around the Golden Gate Bridge in the directed way. The data-logger 22 then fills with frame-by-frame position information that is later used by a special effects production unit to guide the animation of Godzilla. Each frame from the camera 24 is used as a plate upon which the animated image is drawn. Alternatively, the large-scale outdoor XYZ position determination recorded in the database of data-logger 22 is used in an indoor stepper-motor control in model scale of a model Godzilla. The stepper-motor control is used to trace the flight of the helicopter carrying camera 24 in model scale.

Preferably, the navigation satellite receiver 14 includes a connection to a differential-correction receiver 26, such that on-the-fly, real-time kinematic (OTF-RTK) solutions to the three-dimensional position of the navigation satellite receiver 14 may be output at a rate sufficient to keep pace with the advancing frame sequence. Typical OTF-RTK position solutions are accurate to one centimeter. As many as twenty-four (US frame rate) or twenty-five (European frame rate) position solutions accurate to within a few centimeters are expected required each second. Benjamin W. Remondi, describes the status of differential GPS (DGPS) accuracy and on-the-fly (OTF) kinematic GPS (KGPS) in a paper titled, "On-The-Fly Kinematic GPS Results Using Full-Wavelength Dual-Frequency Carrier Ranges". OTF-RTK solutions are preferred when the first production unit 12 is included on a platform with extreme dynamics, such as a helicopter or an airplane.

In an alternative embodiment, where OTF-RTK is unavailable, e.g., in a single frequency (L1 only) GPS receiver 14, a so-called "RTCM" input is included to receive commercial broadcast transmissions. A common differential correction data format used in the industry is called "RTCM-SC104". Many commercial products are equipped to generate and receive RTCM-SC104 data. With just one carrier frequency for ranging, conventional GPS receivers can provide about thirty centimeter accuracy. For RTCM differential applications, both real-time and post-processed solutions are suitable.

A reference station 28, with a fixed, known location, has a navigation satellite receiver 30 which compares its position solutions with its known position and sends the differences out periodically through a transmitter 32 by a radio link 33 to be received by local stations, e.g. the receiver 26. The differential corrections are used to resolve integer ambiguities and to remove random biases in ranging that can occur, such as during periods of selective availability.

Where it is not possible to establish or maintain the radio link 33, the differential corrections that would be sent over the radio link 33 are stored and made available later to the GPS receiver 14, or other navigation processor, for post processing of OTF-RTK solutions. Since the filming need not come together in editing in real-time, it represents a batch process, and post-processing affords an equally-good end result.

A second production unit 36 includes a navigation satellite receiver 38 that derives a precision time base and clock for a time code generator 40. Preferably, the time code generators 20 and 40 are in step with one another by virtue of the highly-accurate time base and clock signals provided in common by the constellation of navigation satellites 18. A camera 42 is frame synchronized by the time code signals from the time code generator 40 and outputs a film or video tape output 44 that includes each frame recorded with a time code. The outputs 23, 25 and 44 are able to be combined according to their embedded time codes.

A special-effects production unit 46 uses one or more of the outputs 23, 25 and/or 44 to control the frame-by-frame creation of animation, models, or other techniques that are merged into a series of composite frames 48 sent to an editing station 50. A composite production output 52 represents a final product of the film and/or video outputs of the cameras 24 and 42 with special-effects from the special-effects production unit 46.

For GPS, each navigation satellite 18 transmits two spread spectrum, L-band carrier signals, an L1 signal having a frequency f1=1575.42 MHz and an L2 signal having a frequency f2=1227.6 MHz. The L1 signal from each satellite is binary phase shift key (BPSK) modulated by two pseudo-random noise (PRN) codes in phase quadrature, designated as the coarse acquisition code (C/A-code) and precision-code (P-code). The L2 signal from each satellite is BPSK modulated by only the P-code.

Use of the PRN codes allows several GPS satellite signals to be used simultaneously to determine an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 1010=10.23 MHz. A second PRN code for each GPS satellite, sometimes referred to as a coarse/acquisition code or C/A-code, is intended to facilitate rapid satellite signal acquisition and hand-over to the P-code and is a relatively short, coarser grained code having a clock or chip rate of 1.023 MHz. The C/A-code for any GPS satellite has a length of 1023 chips and thus repeats every millisecond. The full P-code has a length of 259 days, with each satellite transmitting a unique portion of the full P-code. The portion of P-code used for a given GPS satellite has a length of precisely one week (7.000 days) before this code portion repeats.

The GPS satellite bit stream includes navigational information on the ephemeris of the transmitting GPS satellite and an almanac for all GPS satellites, with additional parameters providing corrections for ionospheric signal propagation delays suitable for single frequency receivers and for an offset time between satellite clock time and true GPS time. The navigational information is transmitted at a rate of fifty baud. A useful discussion of the GPS and techniques for obtaining position information from the satellite signals is found in *Guide To GPS Positioning*, edited by David Wells, Canadian GPS Associates, 1986.

A second satellite navigation system is the global orbiting navigation satellite system (GLONASS), placed in orbit by the former Soviet Union and now maintained by the Russian Republic. GLONASS also uses twenty-four satellites, distributed approximately uniformly in three orbital planes of eight satellites each. Each orbital plane has a nominal inclination of 64.80 relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete seventeen and sixteen revolutions, respectively, around the earth every eight days. The GLONASS system uses two carrier signals L1 and L2 with frequencies of f1=(1.602+9k/16) GHz and f2=(1.246+7k/16) GHz, where k(0, 1, 2, . . . , 23) is the channel or satellite number. These frequencies lie in two bands at 1.597–1.617 GHz (L1) and 1.240–1.260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at rate of fifty baud. Because the channel frequencies are distinguishable from each other, the P-code is the same, and the C/A-code is the same, for each satellite. The methods for receiving and analyzing the GLONASS signals are similar to the methods used for the GPS signals.

A commercially-available time code generator, e.g., the SB-2 GPS, as marketed by Denecke, Inc. (Hollywood, Calif.), may also be used in conjunction with the satellite navigation receivers 14 and 30 to assume the task of generating a compatible time code source for direct connection to a time code camera, for example. The SB-2 GPS generates time code at twenty-four, twenty-five, 29.97 df and thirty frames per second, and will jam to both the output connection and normal SMPTE/EBU time code. The time code output signal of the SB-2 GPS is three volts, which is sufficient to drive most time code cameras in use today. The input level reads down to 0.3 volts and can read most time code sources. The SB-2 GPS time can be locally set with the internal push button and also be used as a strobe to check camera shutter speed. Battery life of the SB-2 GPS is up to sixty hours. The stability is ±3 frames over eight hours from –10C to +60C. with the standard time base and +1 frame per eight hours from –40C. to +85C. with the temperature compensated crystal oscillator (TCXO) option. Such a time code generator preferably also can be used as a master clock. The time code generator is preferably able to set time code from the satellite navigation information deciphered by the satellite navigation receivers 14 and 30 at twenty-four, twenty-five, 29.97 df and thirty frames per second.

Figure 2:
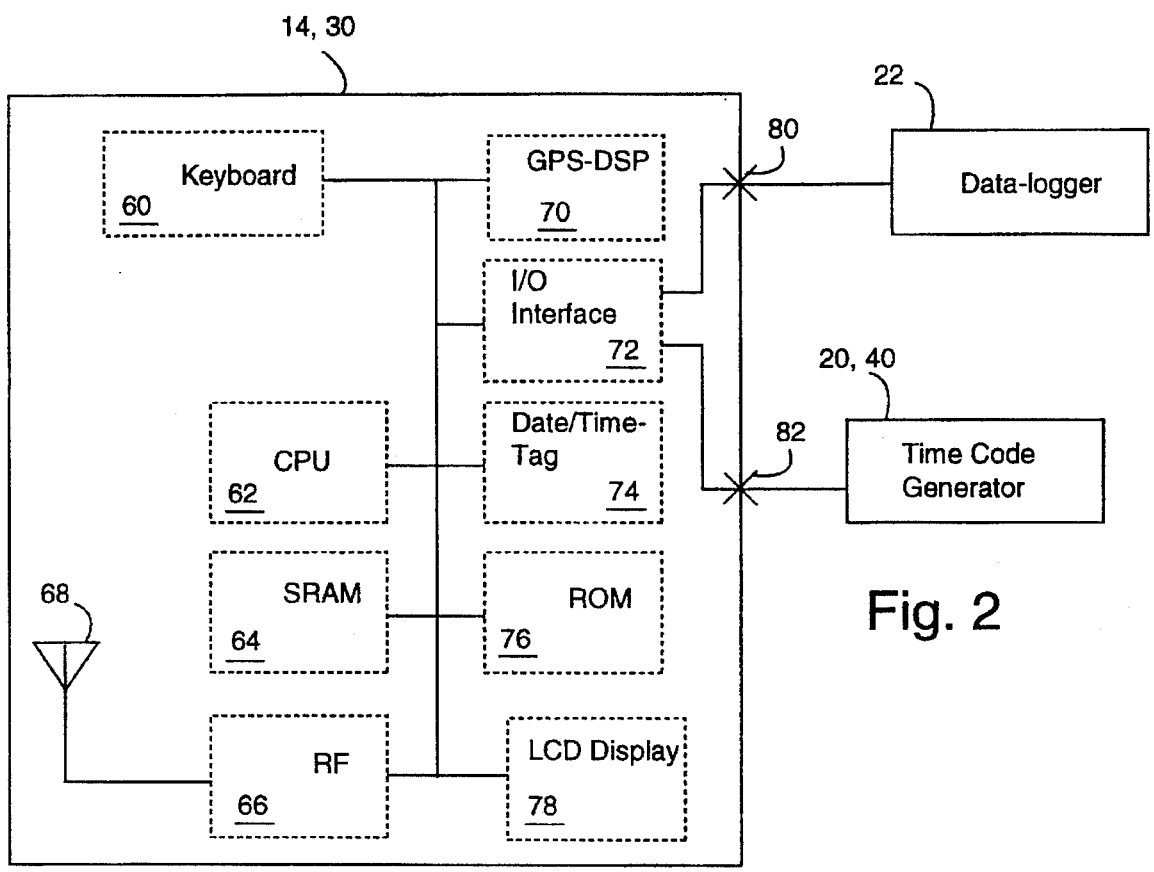

FIG. 2 shows that the navigation satellite receivers 14 and 30 comprise a keyboard 60, a microprocessor (CPU) 62, a static random access memory (SRAM) 64, a radio frequency (RF) downconverter 66 connected to a microwave receiver antenna 68, a GPS digital signal processor (GPS-DSP) 70, an input/output (I/O) interface 72, a date and time tag unit 74 and a read only memory (ROM) 76. A microcomputer, such as the 68000 marketed by Motorola (Phoenix, Ariz.), may be used to implement CPU 62 to generate and recognize alphanumeric user ID codes, to frame and de-frame message packets shipping out and coming in, and to do message protocol and error detection and correction for message frames. A liquid crystal display (LCD) 78 is used by the CPU 62 to communicate with a user. The antenna 68 receives radio signals from the orbiting GPS satellites 18, and RF stage 66 amplifies and down converts such radio signals. A pair of I/O ports 80 and 82 may be separate or combined into a single connector. SRAM 64 has a capacity of 64K bytes and ROM 76 stores eight megabytes. ROM 76 has machine code programmed into it that embodies an operating system for user communication via the keyboard 60 and the LCD 78.

The antenna 68 receives range information from orbiting GPS satellites and sends its amplified signals to the GPS-DSP 70. The CPU 62 helps decode the signals received and converts the information under a program stored in ROM 76 into earth-centered, earth-fixed (ECEF) position determinations which are temporarily stored in SRAM 64. The date/time-tag unit 74 associates a date and/or time tag with each such position determination stored in SRAM 64. Time code information is generated by combining a one-pulse-per-second output from the GPS-DSP 70 with the conventional date and time information available from deciphering the navigation satellite transmissions. For example, in the GPS, code transmission epochs repeat every one millisecond, these epochs are accumulated for the one-pulse-per-second output, accurate to one microsecond. The ROM 76 further includes an application program for generating SMPTE time codes for output on connection 82 from the signals deciphered by the GPS-DSP 70.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A position and time code synchronization system for logging frame-by-frame the position of a first motion picture camera and the time of taking each frame for combining a plurality of video and film sequences into a special effects production, comprising:

a first navigation satellite receiver physically-associated with said first motion picture camera for computing a plurality of three-dimensional earth coordinate positions of said first motion picture camera from microwave radio signals received from a plurality of orbiting navigation satellites, wherein a position is computed for each motion picture frame taken;

first time code generation means connected to the first navigation satellite receiver for generating a plurality of frame synchronization signals derived from stable time-base signals included in said microwave radio signals received from said plurality of orbiting navigation satellites, wherein a time reference is computed for each motion picture frame taken; and data-logging means connected to the first navigation satellite receiver to receive said three-dimensional earth coordinate positions and connected to the first time code generation means to receive said frame synchronization signals and to pair a particular three-dimensional earth coordinate position with each motion picture frame in a sequence.

2. The system of claim 1, further comprising:

a differential-correction receiver connected to the first navigation satellite receiver for providing differential correction data to improve the accuracy of position estimates of said first motion picture camera.

3. The system of claim 2, further comprising:

a differential-correction reference station providing for radio communication with the differential-correction receiver of the difference between a computed position of the reference station with its known, fixed position.

4. The system of claim 2, wherein:

the first navigation satellite receiver is a dual-frequency receiver and provides on-the-fly real-time kinematic (OTF-RTK) solutions for position estimates of said first motion picture camera with current updates at a rate of approximately twenty-four to thirty hertz.

5. The system of claim 2, wherein:

the first navigation satellite receiver is a dual-frequency receiver and provides ranging and time information for a sequence of post-processed on-the-fly real-time kinematic (OTF-RTK) solutions for position estimates of said first motion picture camera at a rate of approximately twenty-four to thirty hertz.

6. The system of claim 2, wherein:

the first navigation satellite receiver is a single-frequency receiver and provides ranging and time information for post-processed position estimates of said first motion picture camera at a rate of approximately twenty-four to thirty hertz.

7. The system of claim 2, wherein:

the first navigation satellite receiver is a single-frequency receiver and provides differentially-corrected position estimates in real-time of said first motion picture camera at a rate of approximately twenty-four to thirty hertz.

8. The system of claim 1, further comprising:

a second navigation satellite receiver independent of said first motion picture camera;

second time code generation means connected to the second navigation satellite receiver for generating frame synchronization signals derived from stable time-base signals included in said microwave radio signals received from said plurality of orbiting navigation satellites that are instep with those generated by the first time code generation means; and a second motion picture camera connected to the second time code generation means for synchronization with said second time code and for recording said time in each of a series of recorded frames which track said position estimates recorded in said data-logging means according to said first time code.

9. The system of claim 1, further comprising:

special-effects means for combining on a frame-by-frame basis a plurality of whole or partial frames of at least one of animation, modeling and computer imagery, frame-by-frame, according to time code and corresponding position estimate information in a database communicated over a connection from the data-logging means.

10. A position and time code synchronization system for logging the position of a motion picture camera frame-by-frame for video and film production of special effects sequences, comprising:

a first navigation satellite receiver physically-associated with said motion picture camera for computing three-dimensional earth coordinate positions of said motion picture camera from microwave radio signals received from a plurality of orbiting navigation satellites;

first time code generation means connected to the first navigation satellite receiver for generating frame synchronization signals derived from stable time-base signals included in said microwave radio signals received from said plurality of orbiting navigation satellites;

data-logging means connected to the first navigation satellite receiver to receive said three-dimensional earth coordinate positions and connected to the first time code generation means to receive said frame synchronization signals and to pair a particular three-dimensional earth coordinate position with each frame in a sequence for said video and film production according to said frame synchronization signals;

a differential-correction receiver connected to the first navigation satellite receiver for providing differential correction data to improve the accuracy of position estimates of said motion picture camera;

a differential-correction reference station providing for radio communication with the differential-correction receiver of the difference between a computed position of the reference station with its known, fixed position;

on-the-fly real-time kinematic (OTF-RTK) solution means included in the first navigation satellite receiver providing for position estimates of said motion picture camera with current updates at a rate of approximately twenty-five hertz;

a first motion picture camera connected to the first time code generation means for synchronization with said first time code and for recording said time in each of a series of recorded frames which track said position estimates recorded in said data-logging means;

a second navigation satellite receiver independent of said motion picture camera;

second time code generation means connected to the second navigation satellite receiver for generating frame synchronization signals derived from stable time-base signals included in said microwave radio signals received from said plurality of orbiting navigation satellites that are instep with those generated by the first time code generation means;

a second motion picture camera connected to the second time code generation means for synchronization with said second time code and for recording said time in each of a series of recorded frames which track said position estimates recorded in said data-logging means according to said first time code; and special-effects means for combining on a frame-by-frame basis a plurality of whole or partial frames of at least one of animation, modeling and computer imagery, frame-by-frame, according to time code and corresponding position estimate information in a database communicated over a connection from the data-logging means.

11. A data-logging apparatus, comprising:

a data-logger with a database of position estimates related to corresponding times in a time code format organized according to the times that motion picture frames were taken;

time code means for providing a time indication by motion picture frame number sequence with a connection to the data-logger; and position estimation means for providing an updated estimate of three-dimensional earth coordinate position in step with each motion picture frame in a sequence through a connection to the data-logger.

12. A method for producing special-effects from motion picture frame sequences, the method comprising the steps of:

generating position estimates of a motion picture camera with a navigation satellite receiver from ranging microwave signal transmissions from orbiting navigation satellites;

generating time-base signals with sequencing at said video or film frame rate with a navigation satellite receiver from time-base signals embedded in said microwave signal transmissions from said orbiting navigation satellites; and data-logging each of said position estimates with a corresponding contemporary one of said time-base signal in a frame-by-frame time code format.

13. The method of claim 12, further comprising the step of:

combining on a frame-by-frame bases a plurality of whole or partial frames of at least one of animation, modeling and computer imagery, frame-by-frame, according to said time code and corresponding position estimate information.

* * * * *